United States Patent [19]
Hersh

[11] Patent Number: 4,992,878
[45] Date of Patent: Feb. 12, 1991

[54] IMAGE TRANSDUCING APPARATUS USING LOW RESOLUTION TRANSDUCERS TO ACHIEVE HIGH RESOLUTION IMAGING

[75] Inventor: Clifford Hersh, Berkeley, Calif.

[73] Assignee: Array Technologies, Inc., Oakland, Calif.

[21] Appl. No.: 471,493

[22] Filed: Mar. 16, 1990

Related U.S. Application Data

[63] Continuation of Ser. No. 262,820, Oct. 26, 1988, abandoned.

[51] Int. Cl.⁵ .................................................... H04N 3/14
[52] U.S. Cl. .............................. 358/213.28; 358/213.31
[58] Field of Search .................... 358/213.28, 213.13, 358/213.11, 163; 250/578

[56] References Cited

U.S. PATENT DOCUMENTS

| Re. 32,137 | 5/1986 | Lianza ................................ 250/578 |
| 4,517,603 | 5/1985 | Epsztein et al. ................ 358/213.28 |
| 4,543,601 | 9/1985 | Harada et al. .................. 358/213.28 |
| 4,595,954 | 6/1986 | Endo et al. ...................... 358/213.28 |
| 4,607,287 | 8/1986 | Endo et al. ...................... 358/213.28 |
| 4,612,581 | 9/1986 | Endo et al. ...................... 358/213.28 |
| 4,634,884 | 1/1987 | Hayashimoto et al. ........... 250/578 |
| 4,652,928 | 3/1987 | Endo et al. ...................... 358/213.28 |

FOREIGN PATENT DOCUMENTS 0015377 1/1984 Japan ............................. 358/213.28
0057583 1/1984 Japan ............................. 358/213.28

Primary Examiner—Stephen Brinich
Attorney, Agent, or Firm—Limbach, Limbach & Sutton

[57] ABSTRACT

An image transducing apparatus is disclosed. An object to be imaged is located in a fixed object plane. A lens focuses the image of the object upon an imaging plane. A photoelectric transducing array having a plurality of congruent, discrete, spaced-apart transducing elements arranged in an array is located in the imaging plane and provides an electrical signal representative of the light intensity thereon. The photoelectric array is movable on a microstage which is movable in two axis. The microstage is mechanically displaced in a direction parallel to the imaging plane from a first position to a plurality of subsequent positions. The distance from each position to a subsequent position is less than the dimension of a transducing element along the direction of the displacement. The photoelectric array is moved and is stopped at each of the displaced positions where an electrical signal from the photoelectric array is taken. The signals from each of the positions traversed by the photoelectric array is combined to form an electrical representation of the image of the object.

6 Claims, 8 Drawing Sheets

MODE 2

1　5　9　13　...

1　5　9　13　...

⋮

IMAGE TRANSDUCING APPARATUS USING LOW RESOLUTION TRANSDUCERS TO ACHIEVE HIGH RESOLUTION IMAGING This is a continuation of application Ser. No. 07/262,820, filed Oct. 26, 1988, now abandoned.

TECHNICAL FIELD

The present invention relates to an improved image transducing apparatus and more particularly to an apparatus wherein an array of photoelectric transducing elements sub-samples the image.

BACKGROUND OF THE INVENTION

Image transducing apparatuses are well-known in the art. For example, U.S. Pat. No. Re. 32,137 discloses an image transducing apparatus. Other image transducing apparatuses are disclosed in U.S. Pat. Nos. 4,607,287; 4,517,603; 4,543,601; 4,595,954 and 4,652,928.

As the price of personal computers has dropped the computing or processing portion of an image transducing apparatus has also decreased. Similarly, as video cameras in the consumer electronics area has proliferated, the price of the photoelectric array transducers used in the video cameras has also decreased. However, photoelectric array transducers used in consumer electronics are not suited for high resolution image transducing. Thus, one drawback has been providing an inexpensive image transducing system using commercially available components.

SUMMARY OF THE INVENTION

In the present invention an image transducing apparatus is disclosed. The apparatus has a slide mount for defining and supporting an object to be imaged. A lens focuses the image of the object upon an imaging plane. An array of photoelectric transducers is located in the imaging plane. The photoelectric array transducers comprises a plurality of congruent, discrete, space-apart transducing elements, arranged in an array. The photoelectric array transducers are mounted on a mechanically movable microstage which is movable in a plane parallel to the imaging plane. The microstage is movable in two directions such that the movement of the microstage from one position to an immediately adjacent position is less than the dimension of each transducing element along the direction of travel. The apparatus further provides a circuit for moving and stopping the photoelectric array transducers at each of the subsequent positions without physical damping or ringing and the like. At each of the stopped positions, the photoelectric array transducers generate an electrical signal. The plurality of electrical signals from each of the stopped positions is combined to form an electrical representation of the image of the object.

DETAILED DESCRIPTION OF THE DRAWINGS

Figure 1:
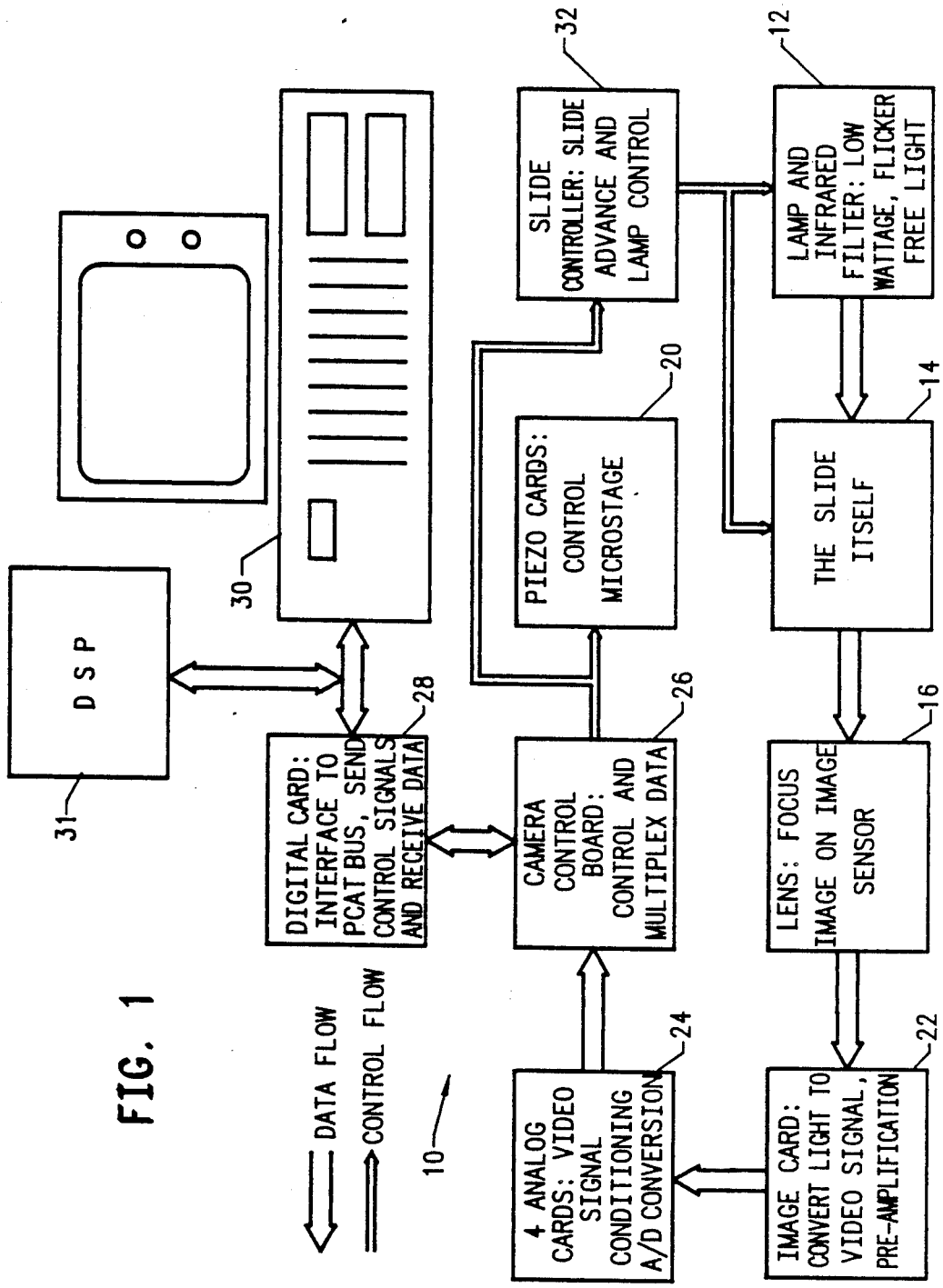
FIG. 1 is an overview block diagram of the apparatus of the present invention, for supplying the electrical signals transduced by the apparatus to a conventional personal computer

Referring to FIG. 1, there is shown an apparatus 10 of the present invention. The apparatus 10 comprises a source of illumination, such as a tungsten halide lamp 12. The illumination from the lamp 12 is passed through a condenser 11 and a filter 13 and impinges a slide 14. The slide 14 is fixedly mounted in an object plane. An image within the slide 14 is then projected onto a lens 16 and is focused at an imaging plane. At the imaging plane is an array of photoelectric transducing elements 18. The photoelectric transducing elements 18 comprises a plurality of congruent, discrete, spaced-apart transducing elements which are arranged in an array. Each of the elements provides an electrical signal representative of the light intensity impinging thereon. In the preferred embodiment, the photoelectric array transducing elements is a photodiode formed on a silicon integrated circuit, manufactured by Hitachi Corporation p/n HE98243.

The photoelectric transducing elements 18 are mounted on a microstage 19 which is mechanically movable. The microstage 19 is movable in an image plane, in a direction substantially perpendicular to the light from the light source 12 impinging on the lens 16 and onto the transducing elements 18. The movement of the microstage 19 is in two dimensions and is moved by piezo electric quartz elements (not shown). Electrical signals supplied to the piezo electric quartz elements causes the movement of the microstage 19. The circuit to control the piezo electric quartz element is the microstage control circuit 20.

The signals from the photoelectric transducing array 18 are also supplied to an image device circuit 22 which provides for preamplification of the signal received from the photoelectric transducing array 18.

The preamplified signals from the imaging circuit 22 are then supplied to an analog-to-digital conversion circuit 24 which conditions the signal and then provides the conversion into digital form.

The signals are then placed on a digital bus 25. The signals from the bus 25 are also supplied to a camera control circuit 26 which controls and multiplexes the data received. Finally, the signals from the camera control circuit 26 are then provided to a digital interface circuit 28 which receives the signals from the camera control circuit 26 and provides the control circuit necessary for the apparatus 10. The digital interface circuit 28 interfaces with a personal computer 30 such as an IBM (trademark of IBM Corporation) PC/AT.

Figure 2:
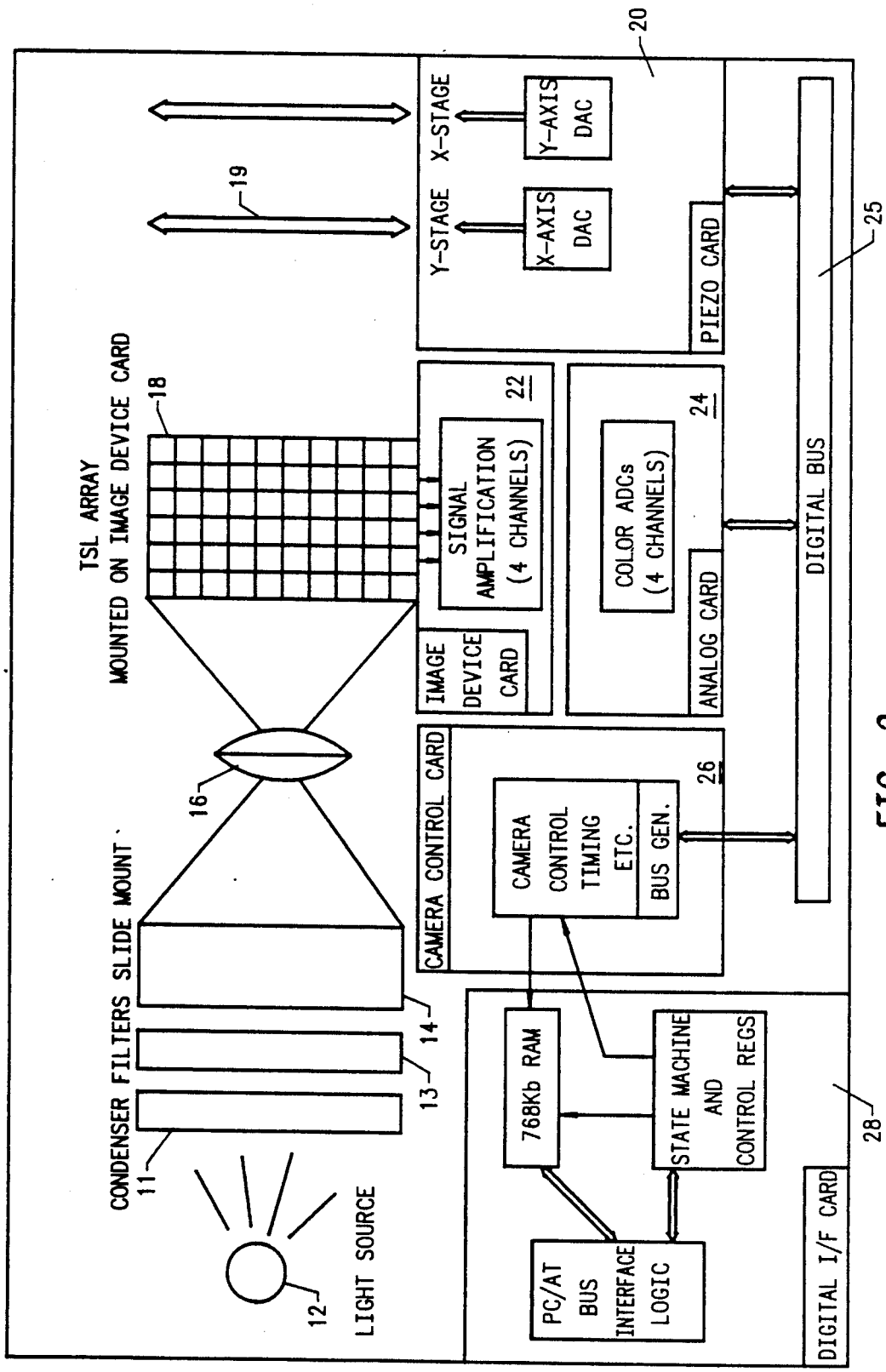
FIG. 2 is a detailed schematic block diagram of the apparatus of the present invention.

Referring to FIG. 2 there is shown in greater schematic block diagram detail form the apparatus 10 of the present invention. The function of the various electronic circuits will now be explained with regard to the operation of the apparatus 10.

When an image is mounted on the slide mount 14, the light source 12 is illuminated causing the image thereof to be impinged on the photoelectric transducing array 18. As previously discussed, the photoelectric transducing array is mounted on a dual-axis piezo electric microstage 19. The microstage 19 is powered by drivers on the piezo electric circuit 20.

The piezo electric circuit 20 decodes microstage 19 movement information from the camera control circuit 26 via the 34 line control bus 25. Using the microstage 19, the array 18 can be moved to scan smaller regions of light from the slide 14. This results in higher resolution than what the photoelectric transducer array 18 can provide. The theoretical basis of this will be discussed hereinafter. The movement of the microstage 19 is in discrete steps from a first position to a plurality of subsequent positions with the movement of each displacement being a fraction of one image pixel.

Figure 3:
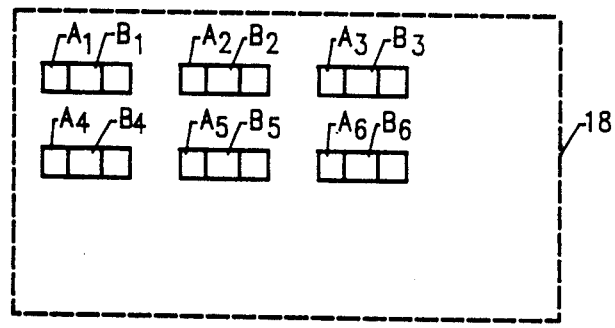
FIG. 3 is a schematic top view showing the movement of the microstage with the photoelectric array transducing elements moved from a first position to an intermediate adjacent position

Referring to FIG. 3 there is shown graphically one such movement. Since the photoelectric transducing elements 18 are spaced apart and are arranged in an array, at one position, denoted by the capital letter A, the imaging pixel area is shown. However, the microstage 19 is moved in a fraction of a pixel distance such that in the subsequent position, denoted by letter B, the second image representation of the image on the slide 14 is generated. As can be seen in FIG. 3, the pixels at position A and the immediate subsequent position B overlap. At each of the positions, the signals from the photoelectric transducing array 18 is read by the imaging device circuit 22 which generates the preamplification signals. Four channels are provided in the imaging device circuit 22, one for each color.

The signals from the image device circuit 22 are then provided to four analog-to-digital converters which are located on the analog circuit 24. There is an analog-to-digital converter for each of the channels of each of the color signals. Each of the converters converts 12 bits of digital information per pixel.

From the bus 25, the signals are then supplied to a camera control circuit 26 and to the digital interface circuit 28.

Figure 4:
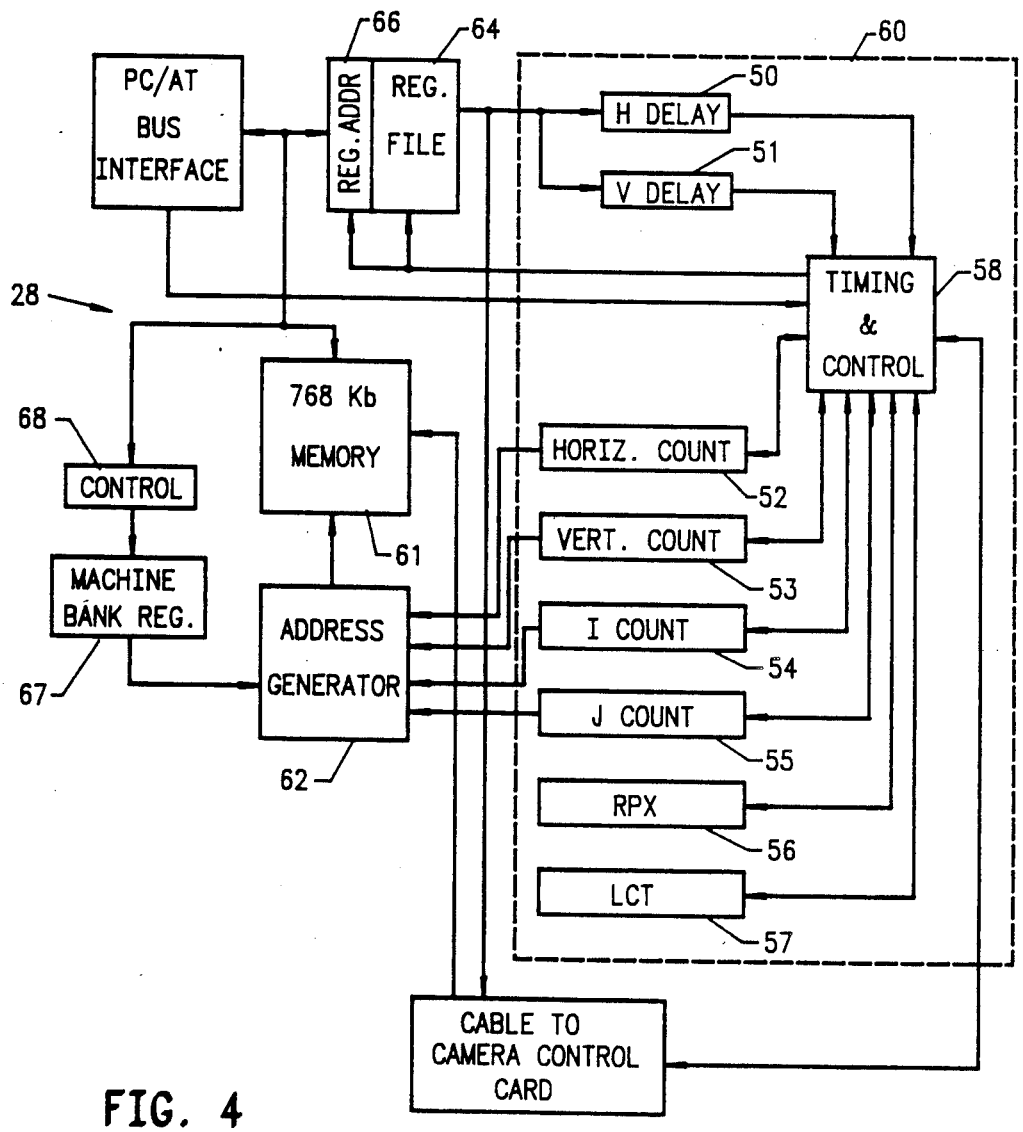
FIG. 4 is a block circuit diagram of the digital interface circuit portion of the apparatus of the present invention.

Referring to FIG. 4 there is shown in greater detail a schematic block level diagram of the digital interface circuit 28. The digital interface circuit 28 contains a state machine 50, a register file 64 with its attending address generator 66, 768K bytes of memory 61 and its attending address generator 62 and a control 68 and machine bank register 67, whose function will be described later.

The digital interface circuit 28 provides an interface to the camera control circuit 26 to control the camera's operation. The digital to analog-converters on the camera control circuit 26 is refreshed every 16 lines during the horizontal blanking period. There are two digital-to-analog converters in the piezo circuit 20 to control the piezo electric quartz elements, which leave fourteen lines free. During the picture portion of the scan, pixel information is transferred from the camera control circuit 26 to the digital interface circuit 28. Other signals which interconnect the camera control circuit 26 and the digital interface circuit 28 include the black-level sample signal, the horizontal and vertical sync signals, and various clock and timing signals.

The state machine 60 comprises 8 counters (50-57) and a timing and control circuit 58. The function of the state machine 60, inter alia, is to provide the correct address to the address generator 62, to store the pixel information provided from the cameral control circuit 26. Of the 8 counters (50-57), two counters RPX 56 and LCT 57 are not used to generate addresses. These are the ones that generate all of the "real" state information, i.e., where the scan is on the array and where the state machine 60 is in the memory cycle. The least significant bits of the RPX counter 56 are free running. The horizontal line length is adjustable only in increments of 32 pixels. Thus, cycles are always completed when lines are changed.

The LCT counter 57 always counts out a full frame, 290 lines. Because the RPX counter 56 needs 13 bits and the LCT counter 57 needs 9 bits, the most significant bits of both counters are stored in the timing and control circuit and not in the counters (56 & 57) themselves.

The other counters (50-55) in the state machine 60 on the digital interface circuit 28 generate addresses (counters 52-55) and X,Y offset (counters 50 & 51) information. A graphical illustration of the relationship of the values stored in the various counters (50-53, 56-57) and a full frame image can be seen by referring to FIG. 5. The values of the two remaining counters, I Count 54 and J Count 55, relate to the position of the pixel in sub-sampling the image, discussed in greater detail hereinafter. The value "Short Line Length" (or XDELAY) is a value stored in one of the registers in the register file 64. Values in H Delay Counter 50 and V Delay 51 are also stored in the register file 64, and loaded into the counters 50 & 51. V Delay 51 is loaded during every vertical reset. H Delay 50 is loaded during every horizontal reset.

There are four basic phases of a scan, i.e., 8 image device lines for a given sub-sample. These include: video reset, time before lines to scan; time during scan; time after lines to scan. Regardless of where the scan is, each pixel has both a horizontal and vertical address and certain events must happen during each particular horizontal and vertical address. That address is generated by the LCT Counter 57 and the RPX Counter 56. These counters 56 & 57, along with flags that determine whether or not the scan is on a line of interest and whether or not there is a pixel of interest, control all of the timing of the entire circuit 28.

The time before the lines of interest are determined by the value in the V Delay counter 51. The number of lines of interest are counted by the Vert Count Counter 53. The time after the lines of interest is indicated by both of these counters 51 & 53 having expired. Vertical reset causes both V Delay Counter 51 and Vert Count Counter 53 to resume their initial state. Vert Count Counter 53 goes from 7-15. Thus, during a single scan, the apparatus 10 of the present invention only scans a small portion of the full image. The V Delay Counter 51 is nine bits and as previously discussed, starts at whatever value is loaded from a register (called the V Delay register) from the register file 64, during the vertical reset time. The vertical reset is called VDELAY slot.

The RPX Counter 56 is reset either at the expiration of ((XDELAY/32 pixels+1)*32 or, if it is the vertical reset, a line of interest or black level setting, then the RPX Counter 56 expires at N count=5120 counts at 16 mHz=320 pixels. As previously discussed, XDELAY is stored in one of the registers of the register file 64, and is loaded into H Delay Counter 50. There are 16 counts per pixel. In the first 250 ns of each line, several values are output from the register file 64 to control the state machine 60. When it is not a line of interest, the XDELAY value is the output of the H Delay Counter 50 during each HDELAY slot which is the horizontal equivalent of VDELAY slot. During DAC slot, which immediately follows HDELAY slot, the value to be next loaded into one of the referenced DAC's is output.

XDELAY is loaded into the H Delay Counter 50 and the line ends when it expires. If the XDELAY value is set too low to include the black level sample period, the scan will not be valid. During a line of interest, the H Delay value from the register file 64 is loaded into the H Delay counter 50. When H Delay Counter 50 expires, the Horiz Count Counter 52 starts counting. During the time that the Horiz Count Counter 52 is counting, the information received from the camera is stored in memory 61. The Horiz Count Counter 52 values are used to compute the address. If the H Delay Count counter 50 is set for more than 64, the scan will not be valid. This allows all of the active elements in the array to be scanned though not at one time. The value of H Delay 50 allows control software in the host PC 30 to adjust the position of the slide within about a 15% range, by altering a register value in the register file 64. The value in V Delay Count counter 51 does the same thing in the other axis.

The line expires at end count. Several lines not to be recorded in memory are also full length in order to accomplish functions necessary to the operation of the state machine 60. Those lines are vertical reset, where all of the counters must be returned to their initial value, etc.

After the lines of interest are stored into the memory 61, the scan sample indices (I Count 54 and J Count 55) are incremented. I Count 54 and J Count 55 contain sub-sample indices. The I Count 54 is always incremented and the J Count 55 is incremented when I Count 54 has reached its maximum value. I Count 54 is then reset. When J Count 55 reaches its maximum value, the scan is complete. The I Count and J Count values are used to compute the address at which a pixel will be stored into memory 61 and are used to determine which values are sent to the microstage 19 to position the photoelectric transducing array 18. I Count counter 54 and J Count counter 55 are thus two level loop counters.

The Timing and Control Circuit 58 of the state machine 60 functions to regulate the counters 50–57 and to set the state for the operation of the state machine 60. The Circuit 58 is comprised of well-know combinatorial logic functions, such as Programmable Array Logic circuits, and counters. The circuit 58 serves four functions, which are shown in FIGS. 7(a–d).

Figures 7A, 7B:
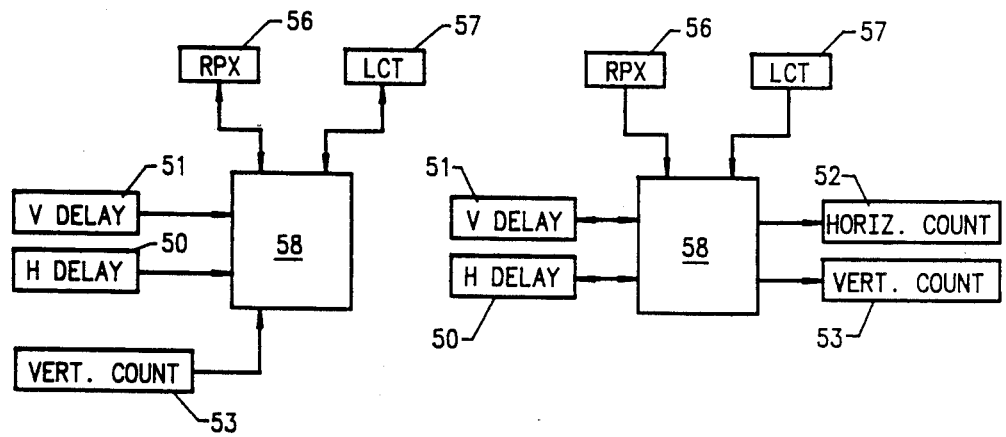
FIGS. 7(a-d) are schematic block diagrams showing the function of the timing and control circuit portion of the digital interface circuit shown in FIG. 4.

In FIG. 7a, the circuit 58 functions to:
1. Reset RPX 56 if RPX=5120
2. Reset RPX 56 if H Delay=0 & V Delay≠0, or H Delay=0 & Vert Count=15
3. Reset LCT 57 if LCT=289

In FIG. 7b, the circuit 58 functions to:
Load H Delay 50 if RPX=4 & LCT≠0
2. Load V Delay 51 if LCT=0 & RPX=4
3. Reset Horiz Count 52 if RPX=0
4. Set Vert Count 53=7 if LCT=0
5. Increment Horiz Count 52 if H Delay=0 & Horiz Count≠255
6. Increment Vert Count 53 if V Delay=0 & Vert Count≠15

Figures 7C, 7D:
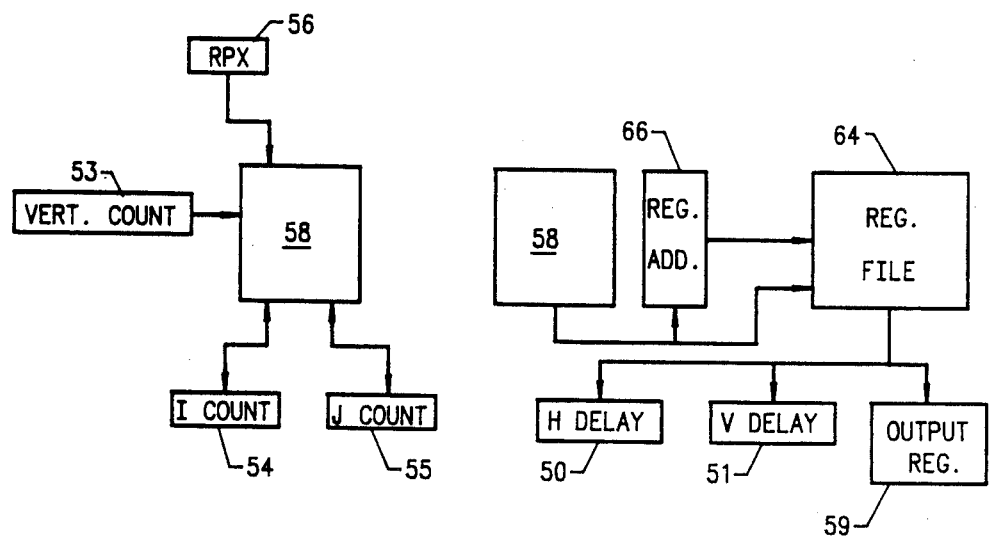

In FIG. 7c, if Vert Count=14 & RPX=5104, then the circuit 58 functions to:
1. Reset I Count & J Count if I=0 & Mode=0
2. Reset I Count & increment J Count if I=1 & J≠1 & Mode=1
3. Reset I Count & increment J Count if I=3 & J≠3 & Mode=2
4. Reset I Count & increment J Count if I=7 & J≠7 & Mode=3
5. Increment I Count 54 if I≠0 & Mode=0
6. Increment I Count 54 if I≠1 & Mode=1
7. Increment I Count 54 if I≠3 & Mode=2
8. Increment I Count 54 if I≠7 & Mode=3
9. Reset J Count 55 if I=0 & J=0 & Mode=0
10. Reset J Count 55 if I=1 & J=1 & Mode=1
11. Reset J Count 55 if I=3 & J=3 & Mode=2
12. Reset J Count 55 if I=7 & J=7 & Mode=3

In FIG. 7d, the circuit 58 functions to:
1. Load X Delay value from register file 64 into H Delay counter 50 if
   a. RPX=4 & V Delay≠0 & LCT≠0; or
   b. RPX=4 & V Delay=0 & Vert Count=15
2. Load H Delay value from register file 64 into H Delay counter 50 if
   a. RPX=4 & V Delay=0 & Vert Count≠15
3. Load V Delay value from register file 64 into V Delay counter 51 if
   a. RPX=4 & LCT=0
4. Load I Count+8 value from register file 64 into output register 59a if
   a. RPX=0 & each of 0th, 1st, 2nd & 3rd LSB of LCT=2
5. Load J Count+12 value from register file 64 into output register 59b if
   a. RPX=0 & each of 0th, 1st, 2nd, & 3rd LSB of LCT=3.

The output registers 59a and 59b are registers in the piezo circuit 20 which are used to control the movement of the microstage 19.

The memory 61 on the digital interface circuit 28 contains 768 kilobytes of memory which spans a megabyte of address space, with 12 bits of pixel information per 16 bits of logical address space. The higher nibble (upper four bits) is ignored on write and are read as zero on read back.

When the state machine 60 is running, i.e., data is being scanned, the pixel information is passed from the camera control circuit 26 to the digital interface circuit 28 and placed into the memory 61. The address is computed by the address generator 62 in accordance with an algorithm described as follows:

| Mode | A0 | A1 | A2 | A3 | A4 | A5 | A6 | A7 | A8 |
|------|-----|-----|-----|-----|-----|-----|-----|-----|-----|
| Column Address: | | | | | | | | | |
| 0 | Cfld | Px0 | Px1 | Px2 | Px3 | Px4 | Px5 | Px6 | Px7 |
| 1 | Cfld | I0 | Px0 | Px1 | Px2 | Px3 | Px4 | Px5 | Px6 |
| 2 | Cfld | I0 | I1 | Px0 | Px1 | Px2 | Px3 | Px4 | Px5 |

-continued

| Mode | A0 | A1 | A2 | A3 | A4 | A5 | A6 | A7 | A8 |
|---|---|---|---|---|---|---|---|---|---|
| 3 | Cfld | I0 | I1 | I2 | Px0 | Px1 | Px2 | Px3 | Px4 |
| Row Address: | | | | | | | | | |
| 0 | Line0 | Line1 | Line2 | MB0 | MB1 | MB2 | MB3 | MB4 | MB5 |
| 1 | Px7 | J0 | Line0 | Line1 | Line2 | MB0 | MB1 | MB2 | MB3 |
| 2 | Px6 | Px7 | J0 | J1 | Line0 | Line1 | Line2 | MB0 | MBI |
| 3 | Px5 | Px6 | Px7 | J0 | J1 | J2 | Line0 | Line1 | Line |

Cfld = Color Field, 4th Least Significant Bit (LSB) of RPX Counter 56;
Px = pixel position, Horiz Count Counter 52;
I = horizontal sub-sample, I Count Counter 54;
J = vertical sub-sample, J Count Counter 55;
Line = line number, Vert Count Counter 53;
MB = machine bank, from Machine Bank Register 57.

There are four possible modes of operation. When Mode=0, there is no sub-sampling of the image. When Mode=1, there is one sub-sample between each sample pixel. When Mode=2, there are three sub-samples between each sample pixel. When Mode=3, there are seven sub-samples between each sample pixel.

The address generation circuit 62 is comprised of three programmable array logic circuits (PAL). A listing of the program to program the PAL is set forth on Appendix A.

Figures 5, 6:
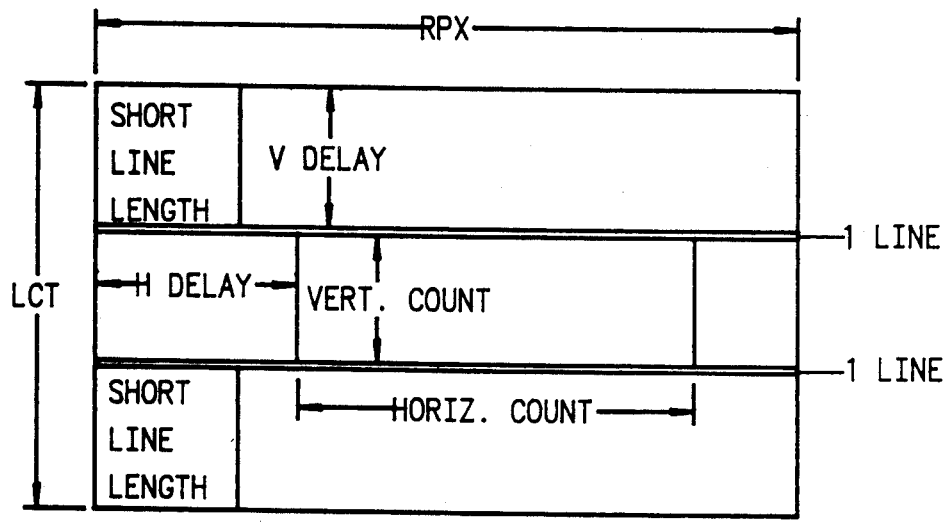
FIG. 5 is a schematic diagram of a full frame of an image showing the various parameters which are stored in the counters shown in FIG. 4.
FIG. 6 is a schematic diagram showing the position of the sub-sample elements scanned from the photoelectric array transducer, while the photoelectric array transducers is in one position.

As previously discussed, when an image is scanned from the photoelectric transducing array 18, it is placed into the memory 61. The data from the photoelectric transducing array 18 is placed into the memory 61 in the sequence received. However, the sequentially received data is stored in the memory 61 with addresses that provide for gaps between adjacent data such that the addresses of the sub-sample data therebetween would be contiguous. Thus, since each of the photoelectric transducing elements 18 sub-samples a portion of the image, and each travels a plurality of distances, the sequence that is stored into the memory 61 would not be of immediately adjacent contiguous elements. The image that would be stored would be a sequence of pixels having the following format. $P_{i,j}, P_{i+n,j}, P_{i+2n,j}, \ldots$. Similarly, in each column of the memory 61, the information is stored in that format. This is shown in FIG. 6 where the information stored in the memory 61 of the first scan comprise the first, fifth, ninth and thirteenth ... pixel of the image as detected by the photoelectric transducing element 18. This is showing the apparatus 10 of the present invention operating in Mode=2, where there are three subsamples between pixels.

Figure 8:
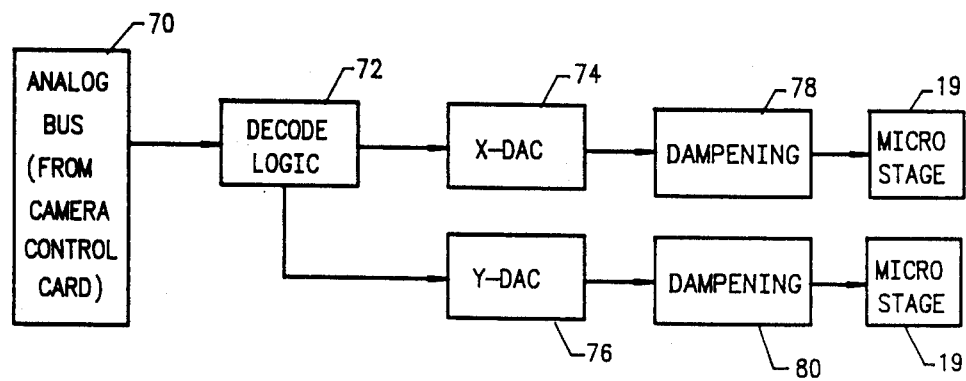
FIG. 8 is a block diagram of the moving and stopping circuit portion of the apparatus of the present invention.

However, from the host processor, i.e., personal computer 30, point of view, the pixels should be read out as if they were contiguous and immediately adjacent. Thus, the function of the PALs is to generate the correct addresses for storing the pixel information such that the sequence of the addresses from the memory 61 would be of immediately continuous adjacent pixels, i.e., $P_{1,1}, P_{1,2}, P_{1,3} \ldots$ One of the features of the present invention is that the microstage 19 is moved from one position to a subsequent position and is stopped when the photoelectric transducing array 18 is scanned. The electronic circuit for moving and stopping the microstage 19 is shown in FIG. 8. The signal from the bus 25 is supplied to a decode logic circuit 72. From the decode logic circuit 72, the position signals apply to an X digital to analog converter 74 and to a Y digital to analog converter 76. From each of the digital analog converters 74 and 76, the analog signals are then supplied to a damping circuit 78 and 80, respectively. From the damping circuit 78 and 80, the output is supplied to the microstage 19 in the two axis.

Figure 9:
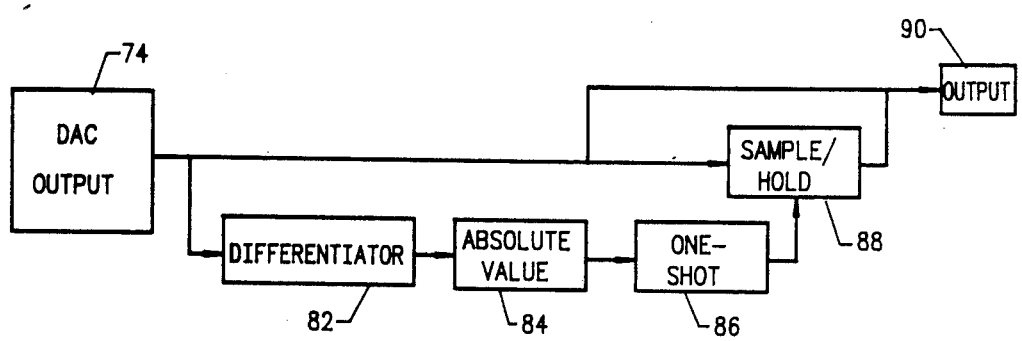
FIG. 9 is a detailed block diagram of a portion of the circuit shown in FIG. 8.

Referring to FIG. 9, there is shown in greater detail the damping circuit 78. The damping circuit 80 is identical to that for the damping circuit 80. The analog output signal of the digital to analog converter 74 is received. The output of the digital analog converter 74 is a signal that approximates a stair-step like signal moving towards the final settling place. The signal is supplied to a differentiator 82 which produces a signal which is the derivative thereof. The derivative of this signal produces spikes at the stair-step inflection points From the differentiator 82, the signal is supplied to an absolute value circuit 84. The absolute value of this signal is then supplied to a one-shot signal 86 which produces a clock for the sample and hold circuit 88. The sample and hold circuit 88 is also supplied with the output of the digital to analog converter 74. The sum of the output of the digital analog converter 74 and the output of sample on hold circuit 88 is the output signal to the microstage 19.

Figure 10A:
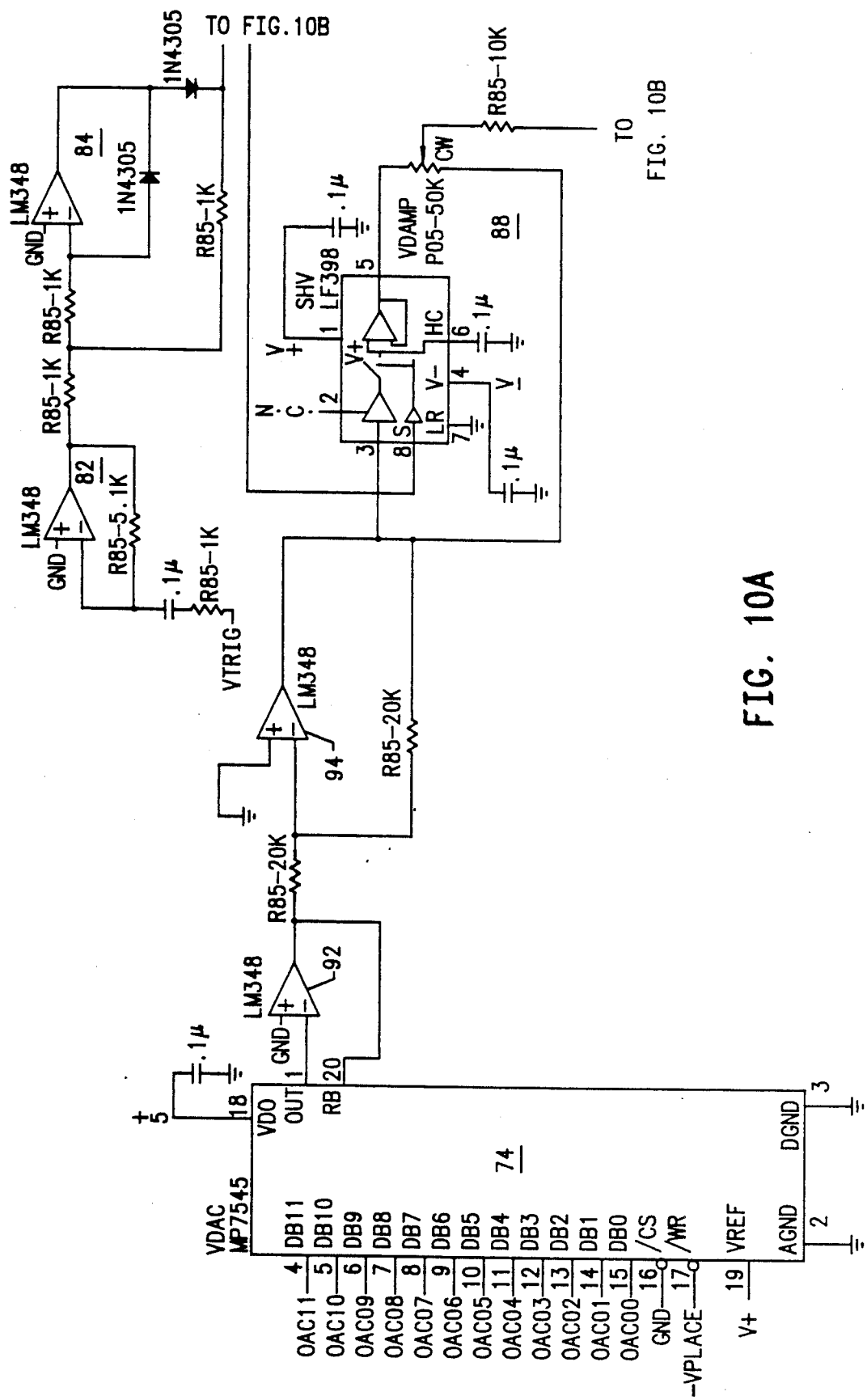
FIGS. 10A-10B is a schematic circuit diagram of the circuit shown in block form in FIG. 9.
Figure 10B:
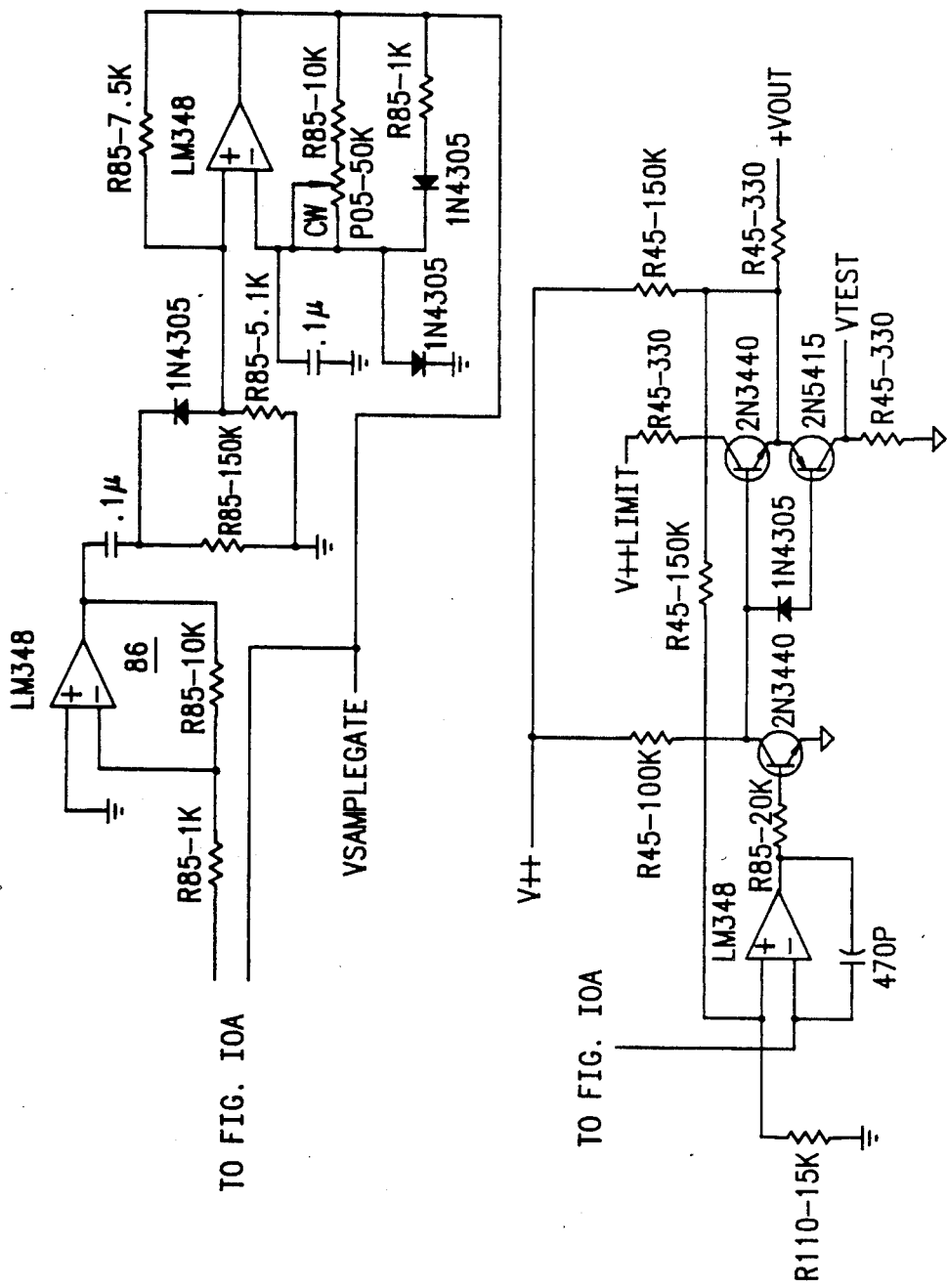

Referring to FIG. 10 there is shown in circuit diagram form the moving and damping circuit 78 previously described. The digital to analog converter 74 produces an output signal whose current is converted to voltage by a current to voltage converter 92. The voltage signal 92 is inverted by an inverter 94. From the inverter 94, the signals are supplied to the sample and hold circuit 88, differentiator 82, etc., all as previously described.

The theory of the moving and stopping circuit 74 and 78 can be understood as follows:

If a crane has a load and it is desired to move the load from point A to point B without having it swinging when it gets to point B, one can move the load initially from A to a point halfway between A and B. Then, one waits for the load to swing to its maximum height and then move the rest of the way to B. The swing back will cancel the energy forward and the weight will be stationary at point B. The assumption for this model is that the crane can move at infinite speed.

For piezo electric microstage 19 which moves a photoelectric transducing array 18 it is nearly true. There are two parameters that must first be determined. These are determined empirically. The first parameter is the resonant frequency of the driven system or the mass of the sensor 18. This is determined by moving the sensor 18 mounted on the microstage 19 and then detecting the resonant frequency of the sensor 18 through an oscilloscope. The one-shot 86 generates a signal which is greater than or equal to one-half the resonant frequency of the sensor 18.

The second parameter is the springiness of the sensor 18, i.e. how far the sensor 18 moves at the resonant frequency. This parameter is also measured by moving the sensor 18 and then measuring the amount of spring by observation on an oscilloscope. Although the microstage 19 acts like the weight damped through a viscous fluid, and thus an extra current is needed to get the desired effect, the time parameter of the one-shot is tunable by turning a potentiometer and viewing the output on the oscilloscope. Thus, the damping circuit 78 moves the microstage 19 by an amount X (typically more than one-half the distance to between adjacent sub-sample pixels), such that X+ the springiness of the sensor 18 would bring the sensor 18 to the desired location of the adjacent sub-sample. The microstage 19 is moved at the rate greater than or equal to the resonant frequency of the sensor 18, i.e. the micro stage 19 is moved when the sensor 18 has reached the position of the adjacent sub-sample. The movement of the microstage 19 at the time when the sensor 18 is at the peak of the resonance would cancel the back swing of the sensor 18.

The circuit described heretofore cancels the primary resonance of the sensor 18. Additional time delayed signals may be used to eliminate higher harmonic resonant signals in the same manner that the primary resonant signal is eliminated.

As previously discussed, one aspect of the apparatus 10 of the present invention is its ability to use photoelectric array transducing elements that has a resolution on the order of 256×256 "pixels", with each "pixel" consisting of four light-sensitive cells which are sensitive to the colors of white, yellow, cyan, and green. By mechanically displacing the microstage 19 upon which the photoelectric transducing array 18 rests, such that from one cell to an immediately adjacent cell is a distance of less than one image pixel, the resolution of the electronic image produced by the photoelectric transducing array 18 is increased. The overlapping of the information from adjacent cells reduces the resolution of the ultimate object in the image plane. However, if we begin with a photographic film media, which can have a resolution at least on the order of 2048 by 2048 pixels, the resolution of the object is extremely high. Thus, although the resolution of the object is sacrificed when the image pixels overlap in the imaging plane, nevertheless, by using this technique, the resolution of the electronic image produced at the imaging plane can be greater than the resolution of the transducing element 18 used. By reducing the resolution, the one increase the number of photons per image site, but reduces the accuracy on the location of the photons. The number of photons per image site times the accuracy of position of the transducing element 18 is a true measure of information that can be derived from the transducing element. Thus, by having highly accurate microstage movement 19, and by having overlapping adjacent pixels, the electronic image that is sensed at the imaging plane can acquire a resolution higher than the sensing transducing elements used.

Because the images of each cell over lap, not all of the information in an image cell is contained in that cell. In theory, some of the information at a cell is contained in all of the other cells. However, there is a practical limit to the amount of information which need be recovered from the other cells to define the information at each particular cell. The technique used to recover information from other cells is a well known convolution algorithm where at each cell, the information contained therein is equal to $$P_0' = 2a_{00} P_{00} - \sum_{-n}^{n} i \sum_{-m}^{m} j\, a_{ij} P_{ij}$$

positive for all i,j and $$2a_{00} - \sum_{-n}^{n} i \sum_{-m}^{m} j\, a_{ij} = 1$$

N and m are arbitrary numbers equal to the kernel size (n×m). For all practical purpose, 7×7 is sufficient kernel size. This calculation can be done in the digital signal processor (DSP) 31 or can be done by the host computer 30.

As can be seen from the foregoing, the apparatus 10 of the present invention envisions the use of low resolution, low cost, photoelectric array transducers to achieve high resolution imaging. Further, a novel all electronic moving and damping circuit is disclosed.

APPENDIX A

```
module maa4
flag    '-r2'      press      reduction by pin
                   TRADEMARK
title 'CAS address generator'

"       aa4 device 'p22v10';
        aa4 device 'p2018';

" rev 00  11/12/87  ed
" rev 01  11/13/87  ed
" rev 02   3/14/88  ed
" rev 03   3/21/88  ed
"
"

" inputs
```

```
    i2, i1, i0              pin 23,14,13;
    rpx03                   pin 16;
    -maccoe                 pin 11;         " MAChine Cas Output Enable
    mode1, mode0            pin 10,9;
    j0                      pin 8;
    px6, px5, px4           pin 7,6,5;
    px3, px2, px1, px0      pin 4,3,2,1;

"outputs maca7, maca6, maca5     pin 22,15,21;
    maca4, maca3, maca2     pin 20,19,18;
    maca1                   pin 17;

" formulas mode = [mode1, mode0];      " mode2 ignored equations enable maca7 = !-maccoe;
         !maca7 = (mode == 0) & !px6
                # (mode == 1) & !px5
                # (mode == 2) & !px4
                # (mode == 3) & !px3;

enable maca6 = !-maccoe;
         !maca6 = (mode == 0) & !px5
                # (mode == 1) & !px4
                # (mode == 2) & !px3
                # (mode == 3) & !px2;

enable maca5 = !-maccoe;
         !maca5 = (mode == 0) & !px4
                # (mode == 1) & !px3
                # (mode == 2) & !px2
                # (mode == 3) & !px1;

enable maca4 = !-maccoe;
         !maca4 = (mode == 0) & !px3
                # (mode == 1) & !px2
                # (mode == 2) & !px1
                # (mode == 3) & !px0;

enable maca3 = !-maccoe;
         !maca3 = (mode == 0) & !px2
                # (mode == 1) & !px1
                # (mode == 2) & !px0
                # (mode == 3) & rpx03;

enable maca2 = !-maccoe;
         !maca2 = (mode == 0) & !px1
                # (mode == 1) & !px0
                # (mode == 2) & rpx03
                # (mode == 3) & (i1 $ j0);

enable maca1 = !-maccoe;
         !maca1 = (mode == 0) & !px0
                # (mode == 1) & rpx03
                # (mode >= 2) & (i0 $ j0);

end maa4
module mac4
flag  '-r3'       " pres_o _eduction by pin title 'RAS and CAS mixed address generator' ac4 device 'p2018';

" rev 00 11/12/87 ed
" rev 01 11/13/87 ed
"
" rev 02  3/15/88 ed/ch

" inputs
```

```
    macb0                   pin 23;          " was (outmoded) mode2
    flippx                  pin 11;          " MSB of I counter
    mode1, mode0            pin 14,13;
    macb5                   pin 10;
    macb4, macb3, macb2     pin 9,8,7;       " machine bank bits
    macb1                   pin 6;
    j2                      pin 5;
    rpx03                   pin 4;
    gl2, gl1                pin 2,1;         " goodline count
    gl0                     pin 3;

-macroe                 pin 21;          " MAChine Ras Output Enable
    -maccoe                 pin 20;          " MAChine Cas Output Enable "outputs maca8                   pin 15;          " RAS addr
    maca7, maca6, maca5     pin 19,18,17;    " RAS addrs
    maca0                   pin 22;          " CAS addr " formulas mode = [mode1, mode0];    " mode2 ignored equations " RAS addreses enable maca8 = !-macroe;
        !maca8 = (mode == 0) & !macb5
               # (mode == 1) & !macb3
               # (mode == 2) & !macb1
               # (mode == 3) & !gl2;

enable maca7 = !-macroe;
        !maca7 = (mode == 0) & !macb4
               # (mode == 1) & !macb2
               # (mode == 2) & !macb0
               # (mode == 3) & !gl1;

enable maca6 = !-macroe;
        !maca6 = (mode == 0) & !macb3
               # (mode == 1) & !macb1
               # (mode == 2) & !gl2
               # (mode == 3) & !gl0;

enable maca5 = !-macroe;
        !maca5 = (mode == 0) & !macb2
               # (mode == 1) & !macb0
               # (mode == 2) & !gl1
               # (mode == 3) & !j2;    " high bank gets inverted by pal cc4

" CAS addresses enable maca0 = !-maccoe;
        !maca0 = !rpx03 $ !flippx;    " switches between color fields and maca
equations xa5 = -macroe & maca5                        " pass it through
        # !-macroe & (mode != 3) & maca5         " pass it through
        # !-macroe & (mode == 3) & !maca5;       " invert it xa3 = -macroe & maca3                        " pass it through
        # !-macroe & (mode != 2) & maca3         " pass it through
        # !-macroe & (mode == 2) & !maca3;       " invert it xa1 = -macroe & maca1                        " pass it through
        # !-macroe & (mode != 1) & maca1         " pass it through
        # !-macroe & (mode == 1) & !maca1;       " invert it
```

```
            dreset    := reset;           " reclocked
state_diagram    [state1,state0]

state 0:        " waiting for -halt
                case    !-halt           :0;        " stay here
                        boot & -halt     :1;
                        !boot & -halt    :2;
                endcase;

state 1:        " waiting for !-halt (got a reset with halt high)
                        " or all done sampling this chunk if !-halt then 0 else 1;            " stay here until !-halt state 2:        " scanning and waiting to start   (!-vdlyslot)
                case    !-halt           :0;
                        boot             :1;
                        -vdlyslot        :2;
                        !-vdlyslot       :3;        " stay here
                endcase;

state 3:        " scanning and waiting to finish  (!-jout)
                        " ignore reset! (it glitches)
                case    !-halt           :0;
                        -jout            :3;        " stay here
                        !-jout           :1;        " all done.
                endcase;

end mcc4
module  mcc4
    flag    '-r3'    " presto reduction by pin
title 'State machine for reset and scan completion. Addr flipper for A1,A3,A5
cc4 device 'P20R4';

" rev 00 11/13/87 ed
" rev 00 12/04/87 ed
".

" inputs

-macroe            pin 11;  " machine ras out enable mode1              pin 10;
        mode0              pin 9;

maca5              pin 8;   " result of all other addr muxes
        maca3              pin 7;
        maca1              pin 6;

reset              pin 5;   " active high signal from the bus
        -halt              pin 4;   " active low signal from our port latch
        -jout              pin 3;   " high when scan is completed
        -vdlyslot          pin 2;   " signals start of scan " 16mhz clock            pin 1;
" outenable     GND      pin 13;

" outputs dreset             pin 20;  " reclocked reset to deglitch
        state1             pin 18;
        state0             pin 17;

xa5                pin 21;  " to high bank rams
        xa3                pin 16;
        xa1                pin 15;
```

" formulas

```
        mode    = [mode1,mode0];
        status  = [state1,state0];   " 0=reset, 1=done, 2=starting, 3=running
        boot    = reset & dreset;
module.mab4
flag    '-r3'   " presto reduction by pin title 'RAS (and casa8) address generator' ab4 device 'p2018';

" rev 000 11/12/87 ed
" rev 001 11/13/87 ed

" inputs

-maccoe                 pin 23;         " MAChine Cas Output Enable
        -macroe                 pin 18;         " MAChine Ras Output Enable
        mode1, mode0            pin 14,13;
        macb1, macb0            pin 11,10;      " machine bank bits
        j1,  j0                 pin 9,8;
        g12, g11, g10           pin 7,6,5;
        px7, px6, px5, px4      pin 4,3,2,1;

"outputs maca8                   pin 17;         " CAS
        maca4, maca3, maca2     pin 22,15,21;
        maca1, maca0            pin 20,19;

" formulas mode = [mode1, mode0];   " mode2 ignored equations enable maca8    = !-maccoe;                     " this one is for CAS
       maca8    = (mode == 0) & px7
                # (mode == 1) & px6
                # (mode == 2) & px5
                # (mode == 3) & px4;

enable maca4    = !-macroe;
       maca4    = (mode == 0) & macb1
                # (mode == 1) & g12
                # (mode == 2) & g10
                # (mode == 3) & j1;

enable maca3    = !-macroe;
       maca3    = (mode == 0) & macb0
                # (mode == 1) & g11
                # (mode == 2) & j1            " high bank gets inverted by pal cc4
                # (mode == 3) & j0;

enable maca2    = !-macroe;
       maca2    = (mode == 0) & g12
                # (mode == 1) & g10
                # (mode == 2) & j0
                # (mode == 3) & px7;

enable maca1    = !-macroe;
       maca1    = (mode == 0) & g11
                # (mode == 1) & j0            " high bank gets inverted by pal cc4
                # (mode == 2) & px7
                # (mode == 3) & px6;

enable maca0    = !-macroe;
       maca0    = (mode == 0) & g10
                # (mode == 1) & px7
                # (mode == 2) & px6
                # (mode == 3) & px5;
end mab4
```

What is claimed is:

1. An image transducing apparatus comprising:
means defining an object plane for supporting a fixed object to be imaged in an image plane;
leans means for focusing the image of said object upon said image plane;
photoelectric array transducing means having a first resolution and comprising a plurality of congruent, discrete, spaced apart transducing elements, arranged in an array, in said image plane for providing an electrical signal representative of the light intensity thereon;
means for mechanically displacing said photoelectric array transducing means in said image plane, in two axes, in a plane parallel to said image plane, from a first position to a plurality of subsequent positions, wherein the distance from one position to an immediate adjacent position is less than the dimension of a transducing element along the direction of said displacement;
means for moving and stopping said photoelectric array transducing means at each of said subsequent positions;
means for generating an electrical signal from each transducing element of said photoelectric array at each of said subsequent positions; and
means for processing said electrical signals from each of said subsequent positions to form an electrical representation of the image of said object having a second resolution greater than said first resolution.

2. The apparatus of claim 1 wherein said processing means is means for forming a convolution of said electrical signals.

3. The apparatus of claim 1 wherein said moving and stopping means further comprises:
means for generating a first signal for moving said photoelectric array transducing means from one position to an intermediate position, approximately one half the distance to an immediate adjacent subsequent position;
means for receiving said first signal and for generating a second signal which is a first derivative thereof;
means for receiving said second signal and for generating a third signal which is the absolute value thereof;
one shot means for receiving said third signal and for generating a fourth signal which is a one shot clock signal, having a time constant approximately one half the rate of said first signal;
sample and hold means for receiving said fourth signal and said first signal and for generating a fifth signal therefrom; and
means for combining said first and fifth signals to produce an output signal to control the movement of said photoelectric array transducing means.

4. The apparatus of claim 1 wherein said combining means further comprises:
memory array means for storing each electrical signal from each subsequent position in the sequence of the signal generated;
means for reading the signals from said memory array means in a sequence different from the sequence stored, wherein said sequence read is representative of said electrical representation of the image of said object.

5. The apparatus of claim 4 wherein said sequence stored into each row of said memory array means is substantially, $P_{i,j}, P_{i+n,j}, P_{i+2n,j}, \ldots$ and the sequence stored into each column of said memory array means is substantially $P_{ij}, P_{ij+n}, P_{i,j+2n} \ldots$ where $n > 1$
i is the x position of the photoelectric array transducing means
i is the y position of the photoelectric array transducing means.

6. The apparatus of claim 5 wherein said sequence read from sid memory array means is in the order of
$P_{11}, P_{12}, P_{13} \ldots$
$P_{21}, P_{22}, P_{23} \ldots$

* * * * *